United States Patent [19]

Baskin

[11] Patent Number: 4,908,257
[45] Date of Patent: Mar. 13, 1990

[54] SIMULATED STONE

[75] Inventor: David Baskin, Duxbury, Mass.

[73] Assignee: Suncor Corporation, Newton, Mass.

[21] Appl. No.: 59,546

[22] Filed: Jun. 8, 1987

[51] Int. Cl.[4] .............................................. B32B 15/00
[52] U.S. Cl. .................................... 428/147; 428/327;
428/407; 428/913.3
[58] Field of Search ............... 428/147, 143, 323, 327,
428/403, 407, 910, 913.3

[56] References Cited

U.S. PATENT DOCUMENTS 2,234,994  3/1941  Vernon et al. ...................... 428/147

FOREIGN PATENT DOCUMENTS 0611794  6/1978  U.S.S.R. ............................... 428/147

Primary Examiner—Nancy A. B. Swisher

[57] ABSTRACT

A cast simulated-stone containing flattened globules of overfilled, cured resin, which flattened globules substitute for natural stone chip additives and other such additives. The globules are formed by mixing an excess of a filler with a catalyzed liquid resin composition, the filler being added in an amount sufficient to cause the liquid to break apart into discrete, separable globules of resin composition. The globules are combined with a liquid resin composition and compressed and flattened in forming the simulated-stone.

5 Claims, 2 Drawing Sheets

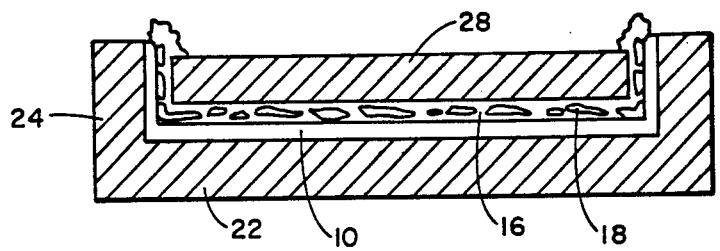
FIG. 4
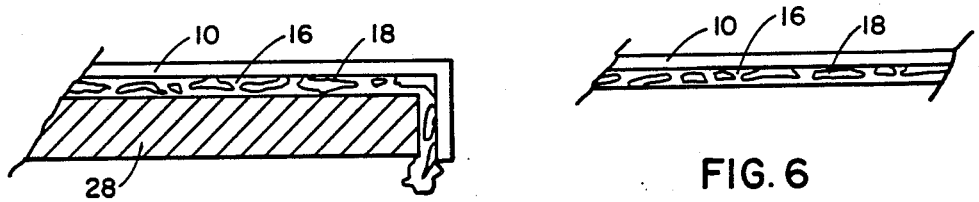
FIG. 5
FIG. 6
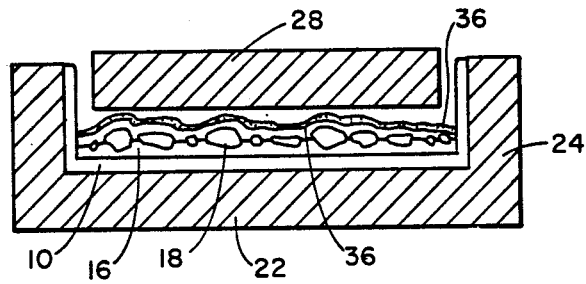
FIG. 7
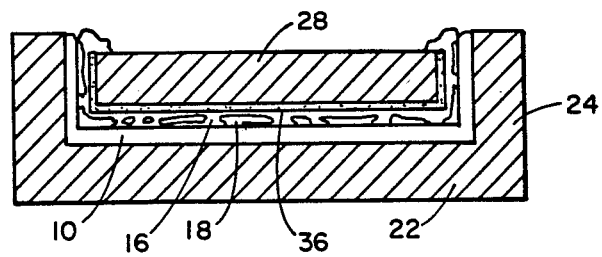
FIG. 8

SIMULATED STONE

BACKGROUND OF THE INVENTION

This invention relates to cast simulated-stone and methods for making such simulated-stone.

Simulated-stone products are well-known and are in great demand due to their low cost relative to natural stone. Simulated stone is useful in the production of walls, floors, fireplaces, table and countertops, tiles, and an assortment of other products. Typically this simulated stone is prepared by casting or molding a curable synthetic resin composition which may contain natural stone additives such as stone chips.

This invention provides a novel simulated-stone that is easy and inexpensive to make. The invention avoids the use and associated expense of natural stone additives. The cured product more closely resembles natural stone than any prior art product known to the inventor.

SUMMARY OF THE INVENTION

Applicants' cast simulated-stone contains flattened globules of overfilled, cured resin, which flattened globules substitute for natural stone chip additives or other such additives. The globules may be formed by mixing an excess of a filler with a catalyzed liquid resin composition, the filler being added in an amount sufficient to cause the liquid to break apart into discrete, separable globules. A colorant may be added to the resin composition so that the globules are colored.

The simulated-stone may be formed by applying a first layer of a clear liquid resin composition to a mold and allowing this first layer to cure. A second layer of a clear liquid resin is applied to this first layer. The globules then are dispersed into this second layer. Next, a flat surface of a solid material may be applied under pressure to the exposed surface of the globules to compress and flatten the globules. The resin and globules then are allowed to cure. A third layer of resin, preferably containing a colorant, may be applied to cover the globules. In this instance the flat surface is applied to the third or topmost layer of resin to compress and flatten the globules. The mixture of resins and flattened globules then is allowed to cure.

The flat surface may be capable of bonding to the curing resin or may be nonstick such that it may be removed from contact with the resin after the resin cures. In the former case, the solid material becomes a backing or support layer for the cured simulated-stone.

BRIEF DESCRIPTION OF THE DRAWINGS

FIG. 4 shows in cross section the cured composition of FIG. 4 after pressure has been applied by the surface to flatten the globules;

FIG. 5 shows in cross section the cured composition of FIG. 4 attached to the flat surface;

FIG. 6 shows in cross section the cured composition of FIG. 4 unattached to any surface;

FIG. 7 shows in cross section an alternative embodiment of the invention utilizing a third layer of resin composition overlaying the globules prior to compression; and FIG. 8 shows in cross section the material of FIG. 7 after compression.

DETAILED DESCRIPTION OF THE DRAWINGS

Figure 1:
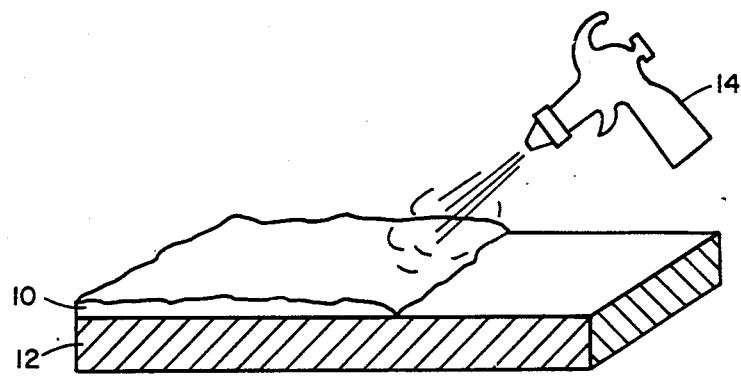
FIG. 1 illustrates the application of a liquid resin composition to a cured resin composition in a mold base.

The invention requires the formation of discrete globules of overfilled, catalyzed, uncured resin composition. The globules are formed by mixing an excess of a filler with a catalyzed liquid resin composition. The filler is added in an amount sufficient to cause the liquid to break apart into discrete, separable globules of a desirable size that do not stick together. The globules will feel like a mixture of sand and pebbles.

The curable synthetic resin composition useful for carrying out this invention may have as a component a polyester, epoxy, urethane or cementitious base. Virtually any curable synthetic resinous liquid coating material may be used. The preferred resin bases are the polymerizable unsaturated polyesters such as those prepared from ethylenically-unsaturated polycarboxylic acids and polyhydric alcohols. The resin compositions also may contain a copolymerizable ethylenically unsaturated compound such as styrene.

In the most preferred embodiment, the primary component of the curable synthetic resin composition is PolyLite ® Polyester Resin 33-031 sold by Reichhold Chemicals, Inc. of Elizabeth, New Jersey. PolyLite ® Polyester Resin 33-031 is an unsaturated polyester resin in styrene monomer and is thixotropic and prepromoted for room temperature cure with the addition of Methyl Ethyl Keytone Peroxide. Its boiling point is approximately 295° F. and its specific gravity is 1.05–1.22 at 25° C. ($H_2O=1$). It is approximately 44–48% styrene monomer and its viscosity is 350–550 (Brookfield Model LVF#3 at 60 rpm CPS).

The fillers useful in forming the globules may be any one of the fillers well known to those skilled in the art including powdered talc, powdered quartz, fine silica, diatomaceous earth, gypsum. powdered glass, clay minerals such as china clay (KALON), illite, powdered chalk, powdered marble, powdered limestone, aluminum silicate, aluminum stearate, calcium silicate, boracite, borax, and alumina trihydrate. The latter, alumina trihydrate, is especially effective in improving the fire resistant properties of the final product and is the preferred filler.

The filler can contribute to the color, transparency, and surface properties of the cured composition. Therefore, it is appropriate to use different fillers when simulating different stones. Preferably the filler is finely divided, resembling fine dust or powder in consistency.

In the more preferred embodiment, the filler is CAB-O-SIL ® M-5 Fumed Silica, an amorphous fumed silica having a specific surface area of 200, plus or minus 25, square meters/gram as determined by B.E.T. method. It is sold by Cabot Corporation of Tuscola, Illinois.

To form the globules, a catalyst first is added to a liquid resin composition. A colorant also may be added as desired. Then, filler is added to the colored, catalyzed liquid resin composition while mixing until the liquid breaks apart into discrete, separable globules of resin that do not stick together. These globules then are ready for use according to the methods of the invention. The globules also may be stored under refrigeration to prevent curing of the globules and then may be used at a later time.

The colorant may be a color pigment, and preferably is an inert, inorganic, finely-divided substance applied either as a dry powder or in paste form. Such color pigments are commonly known and readily available. Most preferably the color pigment is a selected polyester-dispersed pigment, available from American Colors of Sandusky, Ohio. The catalyst may be any of the polymerization catalysts or mixtures thereof well recognized in the art. Typically these are free radical catalysts based on a peroxide-type compound such as for example methyl ethyl keytone peroxide, benzoyl peroxide, tertiary butyl hydroperoxide and the like. Typically the catalyst is added in amounts ranging from about 0.1 to 6% by weight of the polyester resin.

To form the simulated-stone of the invention, a first layer 10 of a clear, catalyzed, liquid resin composition is applied to a mold base 12 using a spray gun 14 (FIG. 1). It should be noted that the first layer 10 of liquid resin composition may be applied to the mold base 12 by other suitable methods such as brushing or rolling. Preferably the first layer 10 of liquid resin composition is applied in a thickness of about 0.020". This first layer is allowed to cure.

Figure 2:
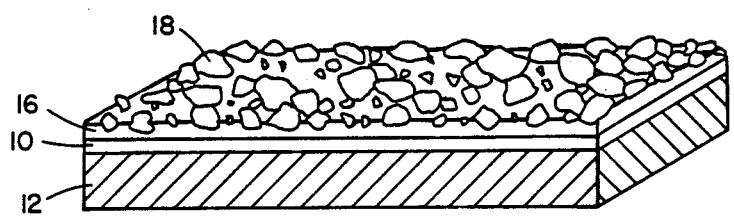
FIG. 2 illustrates the application of a dispersion of the globules of the invention to the surface of the liquid resin composition.

Next, a second layer 16 of a clear, catalyzed liquid resin composition is applied to the cured first layer 10. Before this second layer cures, globules 18 prepared as described above are dispersed by sprinkling them into the surface of the second layer 16 (FIG. 2). The globules 18 may be prescreened or sifted to eliminate any globules that are undesirably large or small. It should be noted that the globules may be applied by suitable methods other than sprinkling such as with a pneumatic spray device. The size of the globules and their density, of course, will affect the appearance of the final product.

Figure 3:
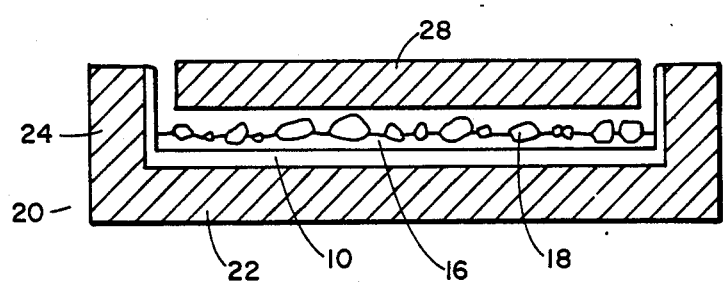
FIG. 3 shows in cross section the combination of the resin layers and globule dispersion in a mold base overlaid by a flat surface of a solid material.

FIG. 3 shows in cross section the two layers 10, 16 of resin composition overlayed with the dispersion of globules 18 in a mold 20. The mold has a base 22 and perimeter walls 24. Also shown in FIG. 4 is a flat surface 26 of a solid material 28 overlying and contacting the globules 18. Preferably the solid material 28 is sized such that it fits within the perimeter walls 24 leaving a space between the periphery of the solid material 28 and the perimeter walls 24. The inner surface of the mold 20 contacting the resin composition is nonstick such that when the resin cures, the product is easily removed from the mold.

The solid material 28 is forced toward the base 22 of the mold 20 to compress and flatten the globules 18 (FIG. 4). Excess resin composition is squeezed through the space between the periphery of the solid material 28 and the perimeter walls 24 as the globules are flattened. Typically, the globules are larger in diameter than the thickness of the second layer 16 to minimize the amount of excess resin that must be squeezed through the space between the solid material 28 and the perimeter walls 24 and to provide for the flattening of the globules 18. The compressed composition then is allowed to cure and the cured product 30 is removed from the mold.

If the surface 26 of the solid material 28 is capable of binding to the resin as the resin cures, then the cured product 30 will be attached to the solid material 28 which solid material 28 will act as a supporting base for the simulated-stone cured product 30 (FIG. 5). This is particularly desirable when the final product is intended to be a countertop, desk top or the like. Furthermore, the solid material 28 and mold 20 may be sized such that sidewalls 32 are formed along with the formation of a flat top surface 34. It should be understood further that simulated-stone products having various shapes including curved surfaces may be formed with appropriate molds according to the invention.

It is also possible to compress and flatten the globules 18 with a solid material 28 having a flat surface 26 that will not bond to the resin as the resin cures. In this instance, the cured product 30 is not attached to a support material (FIG. 6).

FIGS. 7 and 8 show an alternative embodiment of the invention. After applying the globules, a third layer 36 of liquid resin composition is applied to cover the globules 18 and any exposed second layer 16 (FIG. 7). In the preferred embodiment, this layer is applied in a thickness sufficient to impart the desired color, usually no more than 0.005"-0.010". Then the layers of material are compressed to flatten the globules as described above (FIG. 8). The third layer 36 forms the underside of the cured product and may include a colorant to impart a desirable hue consistent with the particular stone being simulated. The first layer 10 forms the exposed surface of the cured product and is clear.

EXAMPLES

EXAMPLE 1

SIMULATED GRANITE

Clear Resin Composition

Base Resin: PolyLite ® Polyester Resin 33-031 obtained from Reichhold Chemicals, Inc. of Elizabeth, New Jersey.

Catalyst: Superox ® M.E.K. Peroxide 46-710, Methyl Ethyl Keytone Peroxide having approximately 9% active oxygen peroxide in dimethylphthyalate obtained from Reichhold Chemicals, Inc. of Elizabeth, New Jersey.

Filler: CAB-O-SIL ® M-5 Fumed Silica obtained from Cabot Corporation of Tuscola, Illinois.

The PolyLite Resin was catalyzed with 1% volume per volume of the Superox ®. Then one part CAB-O-SIL ® was added to three parts of the catalyzed PolyLite ® to form the clear resin composition.

Black Globules

Base resin: PolyLite ® Polyester Resin 33-031.

Catalyst Superox ® M.E.K. Peroxide 46-710

Color Pigment: Black P.C. 1802 and white P.C. 1100 polyester dispersed pigments obtained from American Colors of Sandusky, Ohio.

Filler: CAB-O-SIL ® M-5 Fumed Silica.

The PolyLite ® was catalyzed with 1% volume per volume of the Superox ®. Then a black color composition was prepared by mixing four parts black with one part white polyester dispersed pigments. 5% volume per volume of the black color composition was added to the catalyzed resin composition. Finally, 4 to 5 parts of CAB-O-SIL ® were added to 1 part of the colored resin composition with continuous stirring to form the black globules.

Brown Globules

The brown globules were formed according to the procedure followed for the black globules except that a brown color composition consisting of one part red (PL 1500), one part blue (SP 0088) and two parts yellow (PC 1202) polyester dispersed pigment obtained from American Colors was used in place of the black color composition.

Clear Globules

The clear globules were formed according to the same procedure as the brown and black globules, except that no colorant was added to the resin composition.

Globule Dispersion 1 part black globules, 3 parts brown globules and 3 parts clear globules were mixed together to form the globule dispersion. This dispersion then was refrigerated.

To form the simulated stone, the clear resin composition was applied in a layer of about 0.020" thick to the nonstick surface of a mold and allowed to cure. Next, a second layer about 1/16" (0.0625") thick of the clear resin composition was applied to the cured layer of resin. Then, the dispersion of black, brown and clear globules was sprinkled over the surface of this second layer to completely cover it. The globules were about ¼" in diameter on the average. Particles larger than ⅜" in diameter were prescreened.

Next, a piece of ¾" particle board was applied to the exposed surface of the globules. The particle board was pressed against the globules to compress and flatten the globules. Pressure was applied until the total thickness of the resin and the globules was about ⅜". The resins then were allowed to cure.

EXAMPLE 2

PINK QUARTZ ONYX

Clear Resin Composition

The clear resin composition was formed as described in Example 1.

Globules

Clear globules were formed as described in Example 1.

Colored Resin Composition

A pink color composition was prepared by mixing one part red (PC 1500) with four parts white (PC 1100) polyester dispersed pigments obtained from American Color. 7% volume per volume of this pink color composition was added to PolyLite® Polyester Resin 33-031 catalyzed with 1% volume per volume of Superox®.

To form the pink quartz onyz, a first layer of the clear resin composition was applied to the nonstick surface of a mold in a thickness of about 0.020" and allowed to cure. Next, a second layer of the clear resin composition was applied to the cured first layer in a thickness of about 1/16". The clear globules then were sprinkled upon the surface of this second uncured layer of clear resin composition to completely cover it. Next, a very thin layer of the pink colored resin composition was sprayed over the exposed surface of the clear globules. The thickness of this layer of pink colored resin composition was on the order of about 5–10 thousandths of an inch. Finally, a piece of particle board was placed over this pink colored thin layer and pressed toward the mold until the final thickness of the material between the particle board and the mold was about ⅜". The resins then were allowed to cure and after curing, the particle board with the simulated pink quartz onyz attached to it was removed from the mold.

It should be understood that various changes and modifications of the embodiments shown in the drawings may be made within the scope of this invention. Thus it is intended that all matter contained in the above-description and shown in the accompanying drawings shall be interpreted in an illustrative and not-limiting sense.

What I claim is:

1. A cast simulated-stone containing thermally stable globules of overfilled, cured resin composition.

2. A cast simulated-stone as claimed in claim 1 wherein said globules have a substantially flat surface.

3. A cast simulated-stone as claimed in claim 2 further characterized by said globules being dispersed in a first layer of cured liquid resin.

4. A cast simulated-stone as claimed in claim 3 further comprising,
   a second layer of cured liquid resin bonded to said first layer.

5. A cast simulated-stone as claimed in claim 3 wherein said globules contain a colorant.

* * * * *